(12) United States Patent
Kaufman

(10) Patent No.: US 6,592,967 B2
(45) Date of Patent: Jul. 15, 2003

(54) MICROPRISM REFLECTIVE SHEETING WITH IMPROVED RETENTION OF REFLECTIVITY

(75) Inventor: Alan Kaufman, Hammond, IN (US)

(73) Assignee: Avery Dennison Corporation, Pasadena, CA (US)

( * ) Notice: Subject to any disclaimer, the term of this patent is extended or adjusted under 35 U.S.C. 154(b) by 20 days.

(21) Appl. No.: 09/783,644

(22) Filed: Feb. 14, 2001

(65) Prior Publication Data

US 2002/0110667 A1 Aug. 15, 2002

(51) Int. Cl.[7] ................................................ B32B 3/30
(52) U.S. Cl. ........................ 428/156; 428/500; 428/523; 428/218; 428/163; 428/167; 359/529; 359/530; 359/519
(58) Field of Search ................................. 428/156, 500, 428/523, 218, 163, 167; 359/529, 530, 519

(56) References Cited

U.S. PATENT DOCUMENTS

| | | |
|---|---|---|
| 3,684,348 A | 8/1972 | Rowland |
| 4,601,861 A | 7/1986 | Pricone et al. |
| 5,026,798 A | 6/1991 | Canich |
| 5,117,304 A | 5/1992 | Huang et al. |
| 5,132,380 A | 7/1992 | Stevens et al. |
| 5,175,030 A | 12/1992 | Lu et al. |
| 5,264,063 A | 11/1993 | Martin |
| 5,272,236 A | 12/1993 | Lai et al. |
| 5,278,272 A | 1/1994 | Lai et al. |
| 5,450,235 A | 9/1995 | Smith et al. |
| 5,491,586 A | 2/1996 | Phillips |
| 5,637,173 A | 6/1997 | Martin et al. |
| 5,648,145 A | 7/1997 | Martin |
| 5,703,187 A | 12/1997 | Timmers |
| 5,721,185 A | 2/1998 | LaPointe et al. |
| 5,858,491 A | 1/1999 | Geussens et al. |
| 5,861,463 A | 1/1999 | Sehanobish et al. |
| 5,872,201 A | 2/1999 | Cheung et al. |
| 5,972,443 A | 10/1999 | Breck et al. |
| 5,988,820 A | 11/1999 | Huang et al. |
| 6,013,819 A | 1/2000 | Stevens et al. |
| 6,025,448 A | 2/2000 | Swindoll et al. |
| 6,075,077 A | 6/2000 | Timmers et al. |
| 6,087,447 A | 7/2000 | Stevens et al. |
| 6,357,388 B1 * | 3/2002 | Holtrop et al. ............. 119/161 |

* cited by examiner

*Primary Examiner*—William P. Watkins, III
(74) *Attorney, Agent, or Firm*—Jones Day

(57) ABSTRACT

Flexible retroreflective sheeting, and products therefrom, fabricated from an elastic substantially linear olefin polymer are found to exhibit significantly enhanced retention of retroreflectivity and do not require the addition of plasticizers. The retroreflective sheeting of the invention is a surprisingly good replacement for polyvinyl chloride sheeting which heretofore have shown poor retention of retroreflectivity and have required addition of plasticizers for optimal flexibility and handling.

42 Claims, No Drawings

MICROPRISM REFLECTIVE SHEETING WITH IMPROVED RETENTION OF REFLECTIVITY

FIELD OF THE INVENTION

The present invention relates generally to microprismatic retroreflective sheeting used to manufacture flexible retroreflective microprismatic articles such as roll-up road signs and reflective safety garments. More particularly, the invention is directed to reflective sheeting fabricated from elastic polyolefins known in the art as "plastomers." Plastomeric retroreflective sheeting is found to exhibit a marked improvement in retention of retroreflectivity compared to prior art plasticized polyvinyl chloride (PVC) sheeting. The improvement in retroreflectivity retention results from the ability of retroreflective microprisms (e.g., corner cubes) formed in the plastomeric sheeting to rebound and/or resist permanent deformation when the sheeting is subjected to compression. Moreover, plastomeric retroreflective sheeting can be produced without plasticizers.

BACKGROUND OF THE INVENTION

Retroreflective sheeting, and methods for manufacturing it, are well known in the art. See for example Pricone, U.S. Pat. No. 4,601,861. Such sheeting typically comprises an optically clear layer, having one smooth surface for receiving light, and the opposite surface being provided with multiple microstructures, such as cube corner retroreflective elements. "Cube-corner" is an art-recognized term for structures consisting of three mutually perpendicular faces that form a corner, without regard to the size or shape of each face.

Typical cube corner retroreflective sheeting of the prior art is manufactured of a relatively rigid material such as polycarbonate or polymethylmethacrylate. Such relatively rigid materials effectively maintain the precise cube corner geometry that is necessary for good retroreflectivity. Relatively rigid sheeting of the prior art is advantageously used in flat, relatively rigid articles such as retroreflective highway signs.

For other products, a more flexible retroreflective sheeting is desirable. Retroreflective garments such as safety vests may be worn by construction workers, crossing guards, or pedestrians to make the wearer more conspicuous. The material used in retroreflective garments should be sufficiently flexible to afford comfort to the wearer, yet must retain retroreflectivity, even after being subjected to compressive forces. For example, a construction worker might store a safety vest in a trunk or truck bed with a tool box or other heavy equipment that would press against the retroreflective elements of the vest.

To date, two general types of flexible retroreflective sheeting are known. First, it is known to use plasticized polyvinyl chloride ("PVC") as a flexible retroreflective sheeting material for use in safety garments. Unfortunately, although plasticized PVC is an ideal resin from the standpoint of flexibility, it has proven less than ideal in terms of providing resilient microprism corner cubes capable of rebounding to their original shape after a deforming load is applied to the cubes and removed. This drawback in plasticized PVC sheeting is evident from the rapid losses in retroreflectivity observed after plasticized PVC retroreflective roll-up signs have been in service for periods as short as several months. Unlike rigid forms of sheeting which typically have polymethyl methacrylate or polycarbonate microprisms, microprisms formed in plasticized PVC are subject to deformation when the sheeting material is exposed to the deforming loads typically encountered in the production, handling and ultimate roadway use of such sheetings. If microprism cube corner angles change by more than about 0.01°, or distort as little as 0.0002 mm, the retroreflectance levels will be significantly altered.

Winding of embossed plasticized PVC films prior to fabrication into an end product can also contribute to losses in retroreflectivity. After plasticized PVC sheeting is embossed with microprisms, the embossed sheeting is typically wrapped on a core until it is used to fabricate a finished product. While on the core, the microprisms are subject to a deforming load which is then released when the sheeting is unwound from the core for further manufacturing steps. This load can cause undesirable cube-corner distortion.

Retroreflectivity losses in plasticized PVC microprismatic films are also caused by the migration of plasticizer compounds typically used in the manufacture of such resins. Plasticizers such as dioctyl phthalate or diisononyl phthalate are typically used to enhance the flexibility of plasticized PVC sheeting used for roll-up signs and safety vests. Most plasticizers will eventually migrate from the plasticized PVC film. When flexible plasticized PVC is used for retroreflective applications, plasticizer migration can cause retroreflectivity losses due to slight distortion of the microprism geometry as the plasticizer exudes from the film and changes its overall material composition. This slight distortion in the microprisms can cause a significant change in the retroreflective properties of the film. Plasticizer migration increases with temperature, hence the changes in retroreflectivity due to this phenomenon are particularly noticeable in outdoor applications where the material may be exposed to elevated temperatures during the summer months.

The second general type of prior art flexible retroreflective sheeting is a multi-layer film in which a rigid or semi-rigid film containing corner-cube microprisms is adhered to a flexible film. Such films are disclosed in U.S. Pat. No. 3,684,348 and more recently in U.S. Pat. Nos. 5,450,235 and 5,491,586. Disclosures of multi-layer flexible cube corner retroreflective films are also found in U.S. Pat. Nos. 5,648,145; 5,264,063; and 5,637,173. Another example of a multi-layer film is disclosed in U.S. Pat. No. 5,175,030 which describes a composite plastic article having a tough flexible substrate, on one surface of which are microstructures formed of a cured oligomeric resin. There can be problems with the multi-layer approach of the prior art, however. First, it can be difficult to prepare a multi-layered film when the component films have different physical and chemical properties. Problems can arise from poor adhesion of the layers, and the need for costly processing techniques to overcome the physical differences in the layers. Another problem with multi-layered constructions is that they may not be truly flexible. The presence of a rigid microprism layer can impart an undesirable amount of stiffness to the product.

Attempts have been made in the prior art to overcome the problems that arise from these two approaches. U.S. Pat. No. 5,117,304 discloses a retroreflective article based upon an optically clear, aliphatic polyurethane having hard chain segments and soft chain segments. The articles are said to be characterized by flexibility and conformability over a wide range of application temperatures. Urethane polymers, however, are more costly than plasticized PVC, and present significant handling issues such as the tendency of urethane sheeting to stick to processing equipment and to itself. This problem requires the added expense of a carrier layer.

In summary, while plasticized PVC film is still viewed as a commercially satisfactory resin for some flexible retroreflective sheeting applications, the end user has had to accept a certain degree of microprism distortion, with a corresponding undesirable change in retroreflectivity and limited product longevity, as the trade-offs for good flexibility. The art has yet to meet the challenge of providing a retroreflective sheet that not only has flexibility comparable to plasticized PVC, but also provides microstructures (e.g., corner cubes) that exhibit excellent resilience in response to applied compression.

In view of the foregoing discussion, it is an object of the present invention to provide an article in which microstructures formed on a surface of the article exhibit markedly improved reboundability and retention of geometry in response to applied compression.

A further object is to provide such an article that is flexible and that can be fabricated without plasticizers.

Yet another object of the invention is to provide such a flexible article in the form of retroreflective sheeting having microcube corner elements on one surface thereof and being suitable for use in flexible road signs and safety garments that retain their retroreflectivity over longer periods of use and after being subjected to compression.

Other objects will become apparent hereinafter to those skilled in the art.

SUMMARY OF THE INVENTION

In accordance with the invention, an article is provided having a plurality of microstructures thereon, the microstructures being formed of one or more substantially linear olefin polymers having high melt elasticity, relatively narrow molecular weight distribution, good processability, and good mechanical properties. We have found that flexible microstructures such as microcube corner elements formed of such substantially linear olefin polymers will return to substantially their original shape, even after being subjected to a deforming compressive force. In particular, retroreflective microcube corner elements formed of such substantially linear olefin polymers can be subjected to a deforming compressive force and return to substantially their original shape, including flatness of faces and precision of dihedral angles, to retain desired retroreflective properties.

Preferred substantially linear olefin polymers include those described in U.S. Pat. Nos. 5,272,236 and 5,278,272 to Lai et al., both of which are incorporated herein by reference in their entirety. Examples of preferred substantially linear olefin polymers include the "Affinity" brand of single-site catalyzed polyolefin plastomers offered for sale by Dow Chemical Company.

Retroreflective sheeting fabricated from the above-described thermoplastic elastomers exhibits much greater retention of retroreflectivity after conditions of extended aging and weathering than has heretofore been achieved in retroreflective sheeting fabricated from plasticized polyvinyl chloride. Moreover, such retroreflective sheeting provides excellent flexibility without need for processing additives such as plasticizers. Without being bound to any particular theory, it is believed that the elastomeric property of the polyolefin plastomers, unlike plasticized PVC, enables microcubes formed in a retroreflective sheet to regain and/or retain their original shape after compression.

The substantial improvement in retroreflectivity retention afforded by the present invention makes possible flexible road signs and safety garments which can remain in service much longer than retroreflective products manufactured from plasticized PVC.

DETAILED DESCRIPTION

Generally speaking, the article of the present invention having flexible microstructures on one surface thereof can be in the form of flexible retroreflective sheeting, in which the microstuctures are retroreflective microcubes that exhibit surprisingly improved retention of retroreflectivity when subjected to compressive forces. Such retroreflective sheeting is fabricated from elastic, substantially linear olefin polymers commonly referred to in the polymer arts as "plastomers." More specifically, the substantially linear elastic olefin polymers useful in the present invention include those described in the aforementioned U.S. Pat. Nos. 5,272,236 and 5,278,272. As described therein, such polymers have a melt flow ratio, $I_{10}/I_2 \geqq 5.63$ and preferably about 7 to about 20, and most preferably about 7 to 10; a molecular weight distribution, $M_w/M_n$ (defined by the equation $M_w/M_n \leqq (I_{10}/I_2)-4.63$) of about 1.5 to about 2.5, and preferably about 1.7 to about 2.3; and a critical shear stress at onset of gross melt fracture (as determined in accordance with U.S. Pat. No. 5,272,236) of greater than about $4 \times 10^6$ dyne/cm$^2$. Other properties of substantially linear olefin polymers suitable for use in retroreflective sheeting material of the instant invention include a density of about 0.85 to about 0.95 g/cc, and a melt index, MI, from about 0.01 grams/10 minutes to about 1000 grams/10 minutes. The molecular weight distribution $(M_w/M_n)$ is preferably less than about 5, especially less than about 3.5. Preferably the molecular weight distribution is about 1.5 to about 2.5, and most preferably about 1.7 to about 2.3. For the particular articles described and claimed herein, it is believed that the density is preferably about 0.88 to about 0.930, and most preferably about 0.90; and the melt index is preferably about 0.5 to about 5 g/10 min., and most preferably about 0.5 to about 3 grams/10 min. Melt flow ratio and melt index are determined in accordance with ASTM D-1238, as described in U.S. Pat. No. 5,278,272, incorporated herein by reference. Molecular weight distribution may be determined using known gel permeation chromatography techniques, or in accordance with ASTM D-1238 for measuring melt flow and melt index.

As further explained in U.S. Pat. No. 5,278,272, the substantially linear elastomer polymers useful in articles of the present invention having flexible microstructures can be homopolymers of $C_2$ to $C_{20}$ olefins, such as ethylene, propylene, 4-methyl-1-pentene, etc.; or interpolymers of ethylene with at least one $C_3$ to $C_{20}$ alpha-olefin and/or $C_2$ to $C_{20}$ acetylenically unsaturated monomer and/or $C_4$ to $C_{18}$ diolefins; or interpolymers of ethylene with at least one of the above C-3 to C-20 alpha-olefins, diolefins and/or acetylenically unsaturated monomers in combination with other unsaturated monomers. It is believed that blends comprising such polymers can also be used in articles of the instant invention, where such blends can be fabricated into articles having resilient microstructures, and in particular retroreflective microcubes that regain their retroreflectivity after being compressed.

As further explained in U.S. Pat. No. 5,278,272, monomers usefull in obtaining the plastomers used in the invention include, for example, ethylenically unsaturated monomers, acetylenic compounds, conjugated or nonconjugated dienes, polyenes, carbon monoxide, etc. As taught in U.S. Pat. No. 5,278,272, preferred monomers include the $C_2$ to $C_{10}$ alpha-olefins especially ethylene, propylene, isobutylene, 1-butene, 1-hexene, 4-methyl-1-pentene, and 1-octene; and other preferred monomers include styrene, halo- or alkyl substituted styrenes, tetrafluoroethylene, vinylbenzocyclobutane, 1,4-hexadiene, and naphthenics (e.g., cyclo-pentene, cyclo-hexene and cyclo-octene). Copolymers of ethylene and octene are particularly suitable for use in the instant invention.

As taught in U.S. Pat. No. 5,278,272, the term "substantially linear" polymers means that the polymer backbone is either unsubstituted or substituted with up to 3 long chain branches/1000 carbons. Preferred polymers are substituted with about 0.01 long chain branches/1000 carbons to about 3 long chain branches/1000 carbons, more preferably from about 0.01 long chain branches/1000 carbons to about 1 long chain branches/1000 carbons, and especially from about 0.3 long chain branches/1000 carbons to about 1 long chain branches/1000 carbons. Long chain branching is defined herein as a chain length of at least about 6 carbons, above which the length cannot be distinguished using $^{13}C$ nuclear magnetic resonance spectroscopy. The long chain branch can be as long as about the same length as the length of the polymer back-bone.

As taught in U.S. Pat No. 5,278,272, the polyolefin plastomers may be produced via a continuous controlled polymerization process using at least one reactor, but can also be produced using multiple reactors (e.g., using a multiple reactor configuration as described in U.S. Pat. No. 3,914,342, incorporated herein by reference in its entirety) at a polymerization temperature and pressure sufficient to produce the interpolymers having the desired properties. For example, the polymers may be produced in a continuous process, as opposed to a batch process, wherein the polymerization temperature is from about 20 degrees C. to about 250 degrees C., using constrained geometry catalyst technology. Where a narrow molecular weight distribution polymer having $M_w/M_n$ of from about 1.5 to about 2.5), having a higher $I_{10}/I_2$ ratio (e.g. $I_{10}/I_2$ of about 7 or more, preferably at least about 8, especially at least about 9) is desired, the ethylene concentration in the reactor is preferably not more than about 8 percent by weight of the reactor contents, especially not more than about 4 percent by weight of the reactor contents. Preferably, the polymerization is performed in a solution polymerization process. Generally, manipulation of $I_{10}/I_2$ while holding $M_w/M_n$ relatively low is a function of reactor temperature and/or ethylene concentration. Reduced ethylene concentration and higher temperature generally produces higher $I_{10}/I_2$.

As taught in U.S. Pat. No. 5,278,272, suitable catalysts for preparing the plastomers used in the invention include constrained geometry catalysts as disclosed in U.S. application Ser. Nos. 545,403, filed Jul. 3, 1990 of which issued U.S. Pat. No. 5,703,187 is a division; 758,654, filed Sep. 12, 1991 issued as U.S. Pat. Nos. 5,132,380; 758,660, filed Sep. 12, 1991; and 720,041, filed Jun. 24, 1991 issued as U.S. Pat. No. 5,721,185, the teachings of all of which are incorporated herein by reference. Reference is also made to U.S. Pat. Nos. 5,872,201, 6,013,819, 6,025,448, 6,075,077, 6,087,447, and 6,107,374 all related to Ser. No. 545,403. The monocyclopentadienyl transition metal olefin polymerization catalysts taught in U.S. Pat. No. 5,026,798, the teachings of which are incorporated herein by reference, are also suitable for use in preparing the polymers used in the present invention. The foregoing catalysts may be further described as comprising a metal coordination complex comprising a metal of groups 3–10 or the Lanthanide series of the Periodic Table of the Elements and a delocalized pi-bonded moiety substituted with a constrain-inducing moiety, said complex having a constrained geometry about the metal atom such that the angle at the metal between the centroid of the delocalized, substituted pi-bonded moiety and the center of at least one remaining substituent is less than such angle in a similar complex containing a similar pi-bonded moiety lacking in such constrain-inducing substituent, and provided further that for such complexes comprising more than one delocalized, substituted pi-bonded moiety, only one thereof for each metal atom of the complex is a cyclic, delocalized, substituted pi-bonded moiety. The catalyst further comprises an activating cocatalyst.

Preparation of the above-described substantially linear polyolefin plastomers suitable for use in the invention are described in the above-mentioned Lai et al. U.S. Pat. Nos. 5,272,236 and 5,278,272, which are incorporated herein by reference in their entirety.

In accordance with a preferred embodiment of the instant invention, the plastomer resins described above can be fabricated into retroreflective sheeting exhibiting a good combination of gloss, clarity, flexibility, impact resistance, stress cracking resistance and reboundability of microcubes formed in the sheeting such that the sheeting exhibits excellent retention of retroreflection versus prior art plasticized PVC retroreflective sheeting when microcube corner elements thereon are subjected to compression. Plasticizers are not necessary when the above plastomers are used to fabricate the inventive retroreflective sheeting. The absence of plasticizers is a distinct advantage in the microstructure articles of the instant invention, because there is no migration of plasticizers that can lead to distortion of the microstructure geometry or loss of flexibility. For those embodiments of the instant invention in which the microstructures are retroreflective cube corner elements, the absence of plasticizer migration means that the cube corner elements will maintain their retroreflective properties over a much longer period of time, resulting in a product with a greater useful life as compared to prior art plasticized PVC articles.

Examples of commercially available polyolefin plastomers believed to be suitable for use in the invention include certain substantially linear ethylene polymers commercially available from The Dow Chemical Co. under the trademarks "AFFINITY" and "ENGAGE". Examples of these products, as described in U.S. Pat. No. 5,858,491 to Geussens, et al., which is incorporated herein by reference in its entirety, include:

Affinity PL1880 polyolefin plastomer, which is a substantially linear ethylene/1-octene copolymer having a density of 0.902 g/cm$^3$, $I_2$ of 1.0 g/10 min, a polydispersity (i.e., molecular weight distribution) of 2.0, and $I_{10}/I_2$ of 9.52, a stress at the onset of melt fracture of 4.3×10$^5$ Pa at a shear rate of 1386 sec$^{-1}$;

Affinity FM1570 polyolefin plastomer, which is a substantially linear ethylene/1-octene copolymer having a density of 0.915 g/cm$^3$, $I_2$ of 1.0 g/10 min, a polydispersity of 2.0, and $I_{10}/I_2$ of 10.2, a stress at the onset of melt fracture of 4.3×10$^5$ Pa at a shear rate of 1522 sec$^{-1}$;

Affinity FW1650 polyolefin plastomer, which is a substantially linear ethylene/1-octene copolymer having a density of 0.902 g/cm$^3$, $I_2$ of 3.0 g/10 min, a polydispersity of 2.0, and $I_{10}/I_2$ of 8, a stress at the onset of melt fracture of 3.9×10$^5$ Pa at a shear rate of 2791 sec$^{-1}$;

Affinity XU59206.00 polyolefin plastomer, which is a substantially linear ethylene/1-octene copolymer having a density of 0.902 g/cm$^3$, $I_2$ of 0.6 g/10 min, a polydispersity of 2.0, and $I_{10}/I_2$ of 12, a stress at the onset of melt fracture of 4.3×10$^5$ Pa at a shear rate of 1303 sec$^{-1}$;

Engage LG8005 polyolefin plastomer, which is a substantially linear ethylene/1-octene copolymer having a density of 0.87 g/cm$^3$, $I_2$ of 1.0 g/10 min, a polydispersity of 2.0, and $I_{10}/I_2$ of 7.3, a stress at the onset of melt fracture of $3.0 \times 10^5$ Pa at a shear rate of 513 $\sec^{-1}$ and a stress at the onset of gross melt fracture of $3.4 \times 10^5$ Pa at a shear rate of 743 $\sec^{-1}$.

Of these, the Affinity PL1880 polyolefin plastomer is especially preferred for use in the instant invention.

Use of the above described elastomeric ethylene alpha 1-olefins to fabricate cube corner microprismatic retroreflective sheeting results in products which have markedly enhanced retention of retroreflectivity. The improvement in retroreflectivity retention is believed to be caused by the elastomeric quality of the above resins. Surprisingly, the resins not only afford good "reboundability" of the cubes after placement and removal of a stress thereon; they also afford excellent processibility, clarity and flexibility. The overall combination of properties afforded by the plastomers described above results in the unexpected and surprising ability to substitute these resins for the plasticized PVC of the prior art, yet without substantial changes in the manufacturing conditions used for fabricating the resin into an embossed microstructure sheeting material. Thus, the processing conditions for the preferred plastomers used in the invention, which are well known, present no special processing, handling or additive requirements, beyond those known to persons of ordinary skill, for fabrication of retroreflective films. The resulting products, sold for example as flexible roll up signs, safety vests, etc., exhibit much longer retention of retroreflectivity than the corresponding plasticized PVC products, and hence can be kept in service much longer than such plasticized PVC products. A substantial benefit of these plastomer-based microstructure articles is that they can be fabricated without plasticizers.

Apart from the substitution of the above-referenced plastomeric resins for plasticized PVC, a retroreflective sheet of the present invention may be embossed with microprisms according to techniques which are well known in the art. For example, Pricone et al. U.S. Pat. Nos. 4,486,363 and 4,601,861, both of which are incorporated herein by reference in their entirety, disclose an improved method and apparatus for continuously embossing a repeating pattern of precise detail, in particular, cube-corner type reflector elements, on one surface of a single sheet or on one surface of a laminate of transparent thermoplastic materials, to form retroreflective sheeting. These patents disclose a continuous embossing tool in the form of a flexible thin metal belt or cylinder having on its outer surface an embossing pattern which is the reverse of the precision optical pattern to be formed. The embossing tool is continuously moved at a predetermined speed along a closed course through a heating station where the temperature of a portion of the embossing tool is raised to be above the glass transition temperature of the sheeting or laminate, and a cooling station where the heated portion of the embossing tool is cooled, while in a relatively planar condition, to be below that glass transition temperature. The sheeting is continuously moved at the predetermined speed from a supply thereof into engagement with the embossing pattern on the tool and is pressed thereagainst continuously at a plurality of pressure points sequentially spaced along the heating station, with the one surface of the sheeting confronting and engaging the embossing pattern until the sheeting is raised above its glass transition temperature and conforms to the embossing pattern on the one face. The sheeting is maintained in engagement with the tool until the tool passes through the cooling station and the sheeting is lowered below its glass transition temperature and the pattern solidifies. The sheeting thereafter is stripped from the tool. Further details of the foregoing methodology are described in the above referenced patents.

While the microstructures on a surface of the inventive article preferably are in the form of retroreflective corner cubes, the benefits of the present invention are also obtained when microstructures of different types are fabricated into the polyolefin plastomer described above. For example, a sheeting article of the instant invention may be further processed in a well-known manner to form a plurality of microstructures, such as grooves or Fresnel lenses, for use in other applications such as medical devices or specialty lighting devices.

The retroreflective sheeting of the present invention may be non-colored, or may contain conventional colorants, or may contain any of the well known fluorescent colorants which are known in the art for incorporation in reflective road signs to enhance daytime and nighttime visibility. Such conventional or fluorescent colorants should be selected from those designated by their manufacturers as being suitable for use in olefin resins. For example, DayGlo Corporation of Cleveland, Ohio offers DayGlo ZQ pigments, which we believe are a solution of fluorescent dyes in a thermoplastic modified polyamide resin suitable for this application. DayGlo products Pink GPL11, Yellow GPL17, and Magenta GPL21 may also be suitable. Those skilled in the art will be able to select other suitable fluorescent and non-fluorescent colorants.

In view of the known instability of fluorescent dyes as colorants for thermoplastics, such dyes may be used in combination with one or more of the known UV stabilizing or UV absorbing compounds in order to enhance the fluorescence durability of the dyes when present in articles of the invention. Examples of such compounds include the benzophenones, the benzotriazoles and the hindered amine light stabilizers ("HALS"). A discussion of these compounds may be found in White et al. PCT US/98/03577, which is incorporated herein by reference. Those skilled in the art will be able to select ultraviolet light absorbers and HALS that are suitable for use with olefin polymers, based on manufacturers' recommendations. One UV stablilizing package incorporating a HALS product particularly suited for use with the invention is Ampacet 101042 sold by Ampacet Corporation (Tarrytown, N.Y.). According to Ampacet product literature, the Ampacet 101042 product comprises a Butanedioic acid, dimethyl ester, polymer with 4-hydroxy-2,2,6,6-tetramethyl-1-piperidineethanol.

Other known additives may be used in articles of the instant invention. Known processing aids may be used to eliminate polymer residue on both the extrusion apparatus and the embossing apparatus. A processing aid that has been found to be particularly suitable with the sheeting products of the instant invention is Ampacet 101035 available from Ampacet Corporation of Tarrytown, N.Y. We have found that 1% by weight of Ampacet 101035 eliminates surface haze on embossing belts. Anti-oxidants such as are known in the art also may be used in articles of the instant invention.

The following examples are provided for illustration purposes only and are not intended to limit the invention as described in the appended claims.

EXAMPLE 1

A monolayer sheeting manufactured from Dow Affinity PL1880 polyolefin plastomer with 1% by weight Ampacet 101035 processing aid, and a monolayer sheeting of plasticized PVC manufactured from Ocean Plastics SDPC resin with DINP EN-71 UVI plasticizer, available from Adams Plastics L.P. of Chicago, Ill. were each embossed with an identical pattern of retroreflective cube corner elements, and the retroreflectivity of each sheeting sample was measured at an entrance angle of −4°, an orientation angle of 0°, and an observation angle of 0.1°. Each sheeting sample was placed under a compression load of 0.3 psi for a period of 35 days, after which the retroreflectivity was measured under the same conditions as the first measurement. The percent retention of retroreflectivity was only 30.6% for the PVC retroreflective sheeting, and 94.5% for the retroreflective sheeting fabricated from the polyolefin plastomer in accordance with the instant invention.

EXAMPLE 2

The retroreflective retention of a polyolefin elastomeric retroreflective sheeting made in accordance with the instant invention was compared to a prior art plasticized PVC sheeting when each retroreflective sheeting article is wrapped on a core. A 100 linear foot roll of 6" wide retroreflective sheeting was fabricated from Dow Affinity PL1880 polyolefin plastomer with 1% by weight Ampacet 101035 processing aid and embossed with retroreflective microcube corners. The retroreflectivity of the sheeting was measured at specific marked locations at about 6-inch increments along the entire length of the 100-foot roll. The sheeting was wound around a core using a foam interleaf. The rolled sheeting was laid with its core axis horizontal and stored directly on the floor of a storage area for 12 months. The sheeting was then unrolled and the retroreflectivity was measured at the same marked locations along the entire length thereof. The sheeting retained approximately 88% of its retroreflectivity (as compared to its retroreflectivity measured immediately after being embossed). By comparison, a 24" wide 100 foot long roll of the same plasticized PVC sheeting used in Example 1 above was embossed with an identical pattern of retroreflective microcube corners as the polyolefin sheeting. The retroreflectivity of the plasticized PVC sheeting was measured at specific marked locations at about 6-inch increments along the entire length thereof. The sheeting was wound around a core with a foam interleaf and was stored more carefully, by suspending it horizontally through the core, so that there would be less compression on the bottom of the roll. After only three months of storage as a suspended roll, the plasticized PVC sheeting was found to have retained only about 80% of its retroreflectivity compared to that measured immediately after manufacture, even though it was stored more carefully than the polyolefin sample.

EXAMPLE 3

The UV stability of a retroreflective corner-cube sheeting of the present invention was found to be significantly improved by the addition of a hindered amine light stabilizer. A sheeting fabricated with Dow Affinity PL 1880 polyolefin plastomer with 1% by weight Ampacet 101035 processing aid included 3 weight percent of a commercially available HALS-containing product identified as Ampacet 101042. For purposes of comparison, a polyolefin plastomer sheeting fabricated from Affinity PL 1880 was manufactured without any HALS compound. Both films were subjected to carbon arc accelerated weathering in accordance with ASTM G23-90, method 1 carbon, for a period of 600 hours to simulate UV exposure. It was found that the retroreflective sheeting lacking the HALS additive retained only 0.4% of its retroreflectivity, while the retroreflective sheeting containing the HALS additive retained 48.0% of its retroreflectivity. Thus, a further aspect of the present invention is the combination of a HALS additive with polyolefin plastomer resin in order to provide a retroreflective sheeting having substantially improved resistance to UV weathering.

Various modifications of the foregoing preferred embodiments of the instant invention will be apparent to those skilled in the art of microstructure-bearing polymeric articles. While the invention has been described herein in the form of a monolayer sheeting, it will be appreciated that a cap layer such as is known in the art can be used to provide desired properties such as improved UV protection and weatherability. It may be possible to metallize the cube-corner elements, such as with deposited aluminum or by other metallizing techniques known in the industry. It is preferable to hermetically seal with a backing layer in a pattern to provide a plurality of air cells behind the retroreflective elements. Optionally, an adhesive and a release liner can be provided, as is known in the art.

I claim:

1. A sheeting material comprising
   a flexible, thermoplastic layer having a plurality of retroreflective cube corner microstructures formed on one surface thereof, said layer being fabricated from a resin comprising an elastic, substantially linear olefin polymer, the resin having a melt flow ratio of about 7 to about 20;
   a molecular weight distribution of about 1.5 to about 2.5;
   a density of about 0.85 to about 0.95 g/cm$^3$; and
   a melt index of about 0.5 to about 5 g/10 min.

2. The sheeting material of claim 1 wherein the resin has a density of about 0.88 to about 0.93 g/cm$^3$.

3. The sheeting material of claim 1 wherein the resin has a molecular weight distribution of about 1.7 to about 2.3.

4. The sheeting material of claim 1 wherein the melt flow ratio of the resin is about 7 to about 10.

5. The sheeting material of claim 1 wherein the melt index of the resin is about 0.5 to about 3 g/10 min.

6. The sheeting material of claim 1 wherein the elastic polymer has about 0.01 to about 3 long chain branches/1000 carbons along the polymer backbone.

7. The sheeting material of claim 1 wherein the elastic polymer is a copolymer of ethylene and a $C_3$–$C_{20}$ alpha-olefin.

8. The sheeting material of claim 7 wherein said alpha-olefin is selected from the group consisting of 1-octene, 1-hexene, 1-butene, 4-methyl-1-pentene, and mixtures thereof.

9. The sheeting material of claim 1 wherein the sheeting material further comprises a colorant.

10. The sheeting material of claim 9 wherein the sheeting material further comprises a UV absorbing compound.

11. The sheeting material of claim 9 wherein the sheeting material comprises a hindered amine light stabilizer.

12. The sheeting material of claim 1 wherein said flexible thermoplastic layer is essentially free of plasticizer compounds.

13. A flexible safety vest comprising a sheeting material of claim 1.

14. The safety vest of claim 13 wherein said sheeting material is a monolayer structure.

15. A sign comprising the sheeting material of claim 1.

16. The sign of claim 15 wherein said sheeting material is a monolayer structure.

17. An article comprising a plurality of cube corner microstructures, said cube corner microstructures being formed of a flexible thermoplastic resin material comprising an elastic substantially linear olefin polymer.

18. The article of claim 17 wherein said microstructures are formed by embossing.

19. The article of claim 17 wherein said resin material has a melt flow ratio of about 7 to about 20.

20. The article of claim 19 wherein said resin material has a melt flow ratio of about 7 to about 10.

21. The article of claim 17 wherein said resin material has a molecular weight distribution of about 1.5 to about 2.5.

22. The article of claim 21 wherein said resin material has a molecular weight distribution of about 1.7 to about 2.3.

23. The article of claim 17 wherein said resin material has a density of about 0.85 to about 0.95 g/cm$^3$.

24. The article of claim 23 wherein said resin material has a density of about 0.88 to about 0.93 g/cm$^3$.

25. The article of claim 17 wherein said resin material has a melt index of about 0.5 to about 5 g/10 min.

26. The article of claim 25 wherein said resin material has a melt index of about 0.5 to about 3 g/10 min.

27. The article of claim 17 wherein said substantially linear olefin polymer comprises a copolymer of ethylene and a $C_3$–$C_{20}$ alpha-olefin.

28. The article of claim 27 wherein said alpha-olefin is selected from the group consisting of 1-octene, 1-hexene, 1-butene, 4-methyl-1-pentene, and mixtures thereof.

29. The article of claim 28 wherein said olefin is 1-octene.

30. The article of claim 17 wherein the substantially linear olefin polymer has about 0.01 to about 3 long chain branches/1000 carbons along the polymer backbone.

31. The article of claim 17 wherein said flexible thermoplastic material is in the form of a flexible sheeting material having said microstructures formed on a surface thereof.

32. The article of claim 31 wherein said flexible sheeting material is a monolayer structure.

33. The article of claim 31 wherein said flexible sheeting material is a multi-layer structure.

34. The article of claim 17 further comprising a colorant.

35. The article of claim 34 further comprising a UV absorbing compound.

36. The article of claim 34 further comprising a hindered amine light stabilizer.

37. The article of claim 17 wherein said microstructures are essentially free of plasticizer compounds.

38. The article of claim 31 wherein said microstructures are retroreflective cube corner elements.

39. The article of claim 38 wherein said article is a garment.

40. The article of claim 39 wherein said garment is a safety vest.

41. The article of claim 38 wherein said article is a sign.

42. The article of claim 41 wherein said sign is a flexible roll-up sign.

* * * * *